United States Patent [19]
Ehret et al.

[11] 3,954,161
[45] May 4, 1976

[54] FREE-WHEELING ARRANGEMENT, ESPECIALLY FOR THE GUIDE WHEEL OF HYDRODYNAMIC TORQUE CONVERTERS

[75] Inventors: Fritz Ehret, Fellbach; Otto Wörner, Reutlingen; Ulrich Juskowiak, Stuttgart, all of Germany

[73] Assignee: Daimler-Benz Aktiengesellschaft, Germany

[22] Filed: Aug. 26, 1974

[21] Appl. No.: 500,710

[30] Foreign Application Priority Data
Aug. 28, 1973 Germany............................ 2343288

[52] U.S. Cl.................................... 192/45; 74/677
[51] Int. Cl.².......................................... F16D 41/06
[58] Field of Search.................. 192/44, 45; 188/82, 188/84; 74/677; 29/432

[56] References Cited
UNITED STATES PATENTS

| | | | |
|---|---|---|---|
| 549,377 | 11/1895 | Ljungstrom............................ | 192/45 |
| 1,708,215 | 4/1929 | Chryst.................................... | 192/45 |
| 2,890,602 | 6/1959 | Smirl et al. ....................... | 74/677 X |
| 3,556,189 | 1/1971 | Ernest.................................... | 29/432 |
| 3,691,854 | 9/1972 | Barthruff et al. ................. | 192/45 X |

FOREIGN PATENTS OR APPLICATIONS

| | | | |
|---|---|---|---|
| 1,026,948 | 4/1966 | United Kingdom................... | 192/45 |

*Primary Examiner*—Allan D. Hermann
*Attorney, Agent, or Firm*—Craig & Antonelli

[57] ABSTRACT

A free-wheeling arrangement in which gripping rollers are arranged between an inner race and an outer race which is equipped with gripping surfaces and short abutment flanks; the gripping rollers are forced into the gripping position by springs which are supported on cross tongues of a cage formed by a sheet metal ring, out of which are punched out the cross tongues; the sheet metal ring of a cage is thereby fixed in the axial direction by the clamping-in action between the outer race and the structural part accommodating the same while an outwardly directed nose portion is provided at least at one cross tongue of each cage to prevent relative rotation, which engages in a cross groove provided in the inner contour of the outer race; a disk covers off the free-wheeling device which serves simultaneously as abutment for the gripping rollers.

21 Claims, 7 Drawing Figures

FREE-WHEELING ARRANGEMENT, ESPECIALLY FOR THE GUIDE WHEEL OF HYDRODYNAMIC TORQUE CONVERTERS

The present invention relates to a free-wheeling arrangement, especially for the guide wheel of hydrodynamic torque converters, for the support of reaction members in planetary gear sets or similar functions, whereby clamping or gripping rollers are arranged between an inner race and an outer race equipped with gripping surfaces and short abutment flanks, which gripping rollers, each by itself, are forced into the clamping or gripping position by springs, whereby the springs are supported on cross tongues of a cage, and whereby the cage is formed by a sheet metal ring disposed adjacent the gripping rollers, out of which the cross tongues are stamped out or punched out and are bent off approximately at right angle to the ring plane.

A known-free-wheeling device of the aforementioned type (German Auslegeshrift No. 1,254,916) includes two pot-shaped sheet metal shells which form by means of corresponding profiled configurations, the outer race with its gripping surfaces. The gripping or clamping surfaces therefore have to be realized by imparting a profiling to the sheet metal pots, which naturally involve considerable difficulties and may lead to inaccuracies. The cage, to which additionally belongs, so to speak of, a separate butting disk or thrust washer, floats on the inside of the housing formed in this manner. This known-free-wheeling device leaves a great deal to be desired as regards accuracy and as regards the cage guidance. Also, the assembly is quite complicated. The cage is not accurately guided in the direction of rotation but supports itself in the free-wheeling direction at the abutment flanks by corresponding noses. A fixing does not exist in the blocking direction.

The present invention is concerned with the task to avoid the described disadvantages. The free-wheeling device of this invention is therefore to be simplified as regards accuracy, as regards its construction and as regards its assembly possibilities. The underlying problems are solved according to the present invention with the free-wheeling arrangements of the aforementioned type in that the sheet metal ring of a cage is fixed in the axial direction by clamping-in action between the outer race and the structural part accommodating the same, for example, a guide wheel hub, in that for purposes of securing against rotation a radially outwardly directed nose portion is provided at least at one cross tongue of each cage which engages in a cross groove provided in the inner contour of the outer race, and in the free-wheeling device is covered off by a disk secured at the accommodating or receiving member, which serves simultaneously as axial abutment for the clamping or gripping rollers.

The arrangement according to the present invention offers the advantage that together with a completely satisfactory fixing of all parts with respect to each other, a very simple assembly is possible. It is then further proposed by the present invention that two identically constructed cages be provided and be rotated with respect to each other by one-half the spacing or pitch of the cross tongues and that for each cage a separate cross groove is provided in the outer race as a means for preventing rotation. With relatively long cross tongues—which requires a relatively large pitch—one is nonetheless able to accommodate in this manner a large number of cross tongues and as a result thereof also a relatively large number of gripping rollers. The free-wheeling device is therefore capable of being subjected to greater loads.

Furthermore, it is additionally proposed by the present invention that the outer race is provided at the outer circumference thereof with a serration and that it is pressed in by means of this serration into the bore of the accommodating or receiving part. In detail, the outer race is provided for that purpose according to the present invention, starting from a side surface, with a centering collar whereas, starting from the other side surface, it is provided with the serration, and whereby a somewhat deeper annular groove for the accommodation of the displaced material is disposed between these two sections. A further simplification in the assembly and additionally a very reliable axial fixing of the cage and of the outer race is achieved in this manner. The cover disk then assumes according to the present invention also the abutment for the gripping rollers and simultaneously fixes the inner race in the axial direction.

Accordingly, it is an object of the present invention to provide a free-wheeling arrangement, especially for the guide wheel of hydrodynamic torque converters and the like which avoids by simple means the aforementioned shortcomings and drawbacks encountered in the prior art.

Another object of the present invention resides in a free-wheeling arrangement which avoids difficulties in the manufacture thereof and enables the elimination of inaccuracies.

A further object of the present invention resides in a free-wheeling device of the type described above which greatly simplifies the assembly and ensures an accurate guidance of the cage in both directions of rotation.

Still a further object of the present invention resides in a free-wheeling arrangement which permits the accommodation of a relatively large number of gripping rollers, notwithstanding the existence of relatively long cross tongues requiring a relatively large spacing.

Another object of the present invention resides in a free-wheeling device of the type described above which is capable of withstanding greater loads without increase in size or complexity of structure.

These and further objects, features and advantages of the present invention will become more apparent from the following description when taken in connection with the accompanying drawing which shows, for purposes of illustration only, one embodiment in accordance with the present invention, and wherein.

Figure 1:
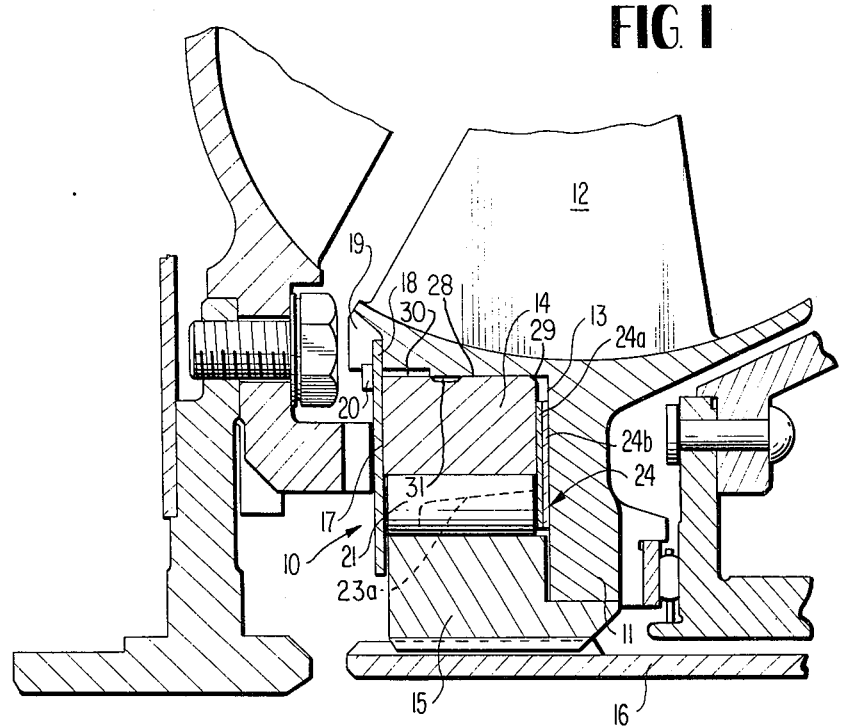
FIG. 1 is a cross-sectional view through a free-wheeling arrangement in accordance with the present invention in a guide wheel of a hydrodynamic torque converter.
Figure 2:
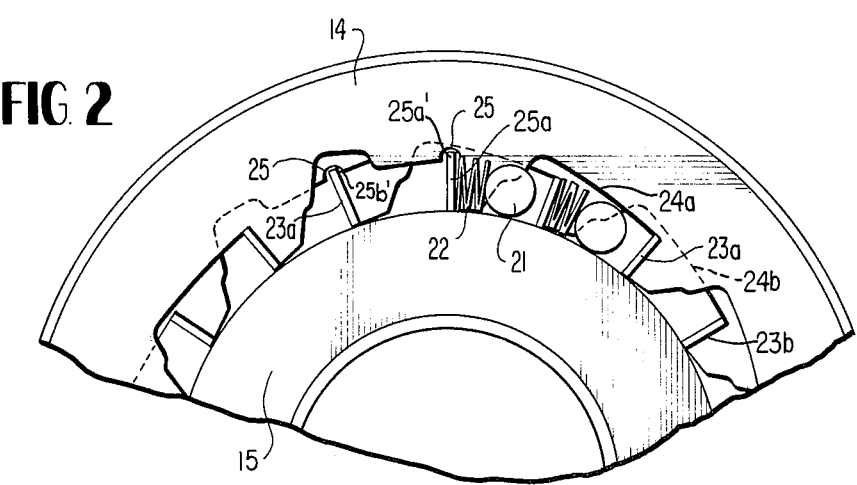
FIG. 2 is a partial side elevational view of the free-wheeling arrangement of FIG. 1 with the cover plate removed.

Referring now to the drawing wherein like reference numerals are used throughout the various views to designate like parts, and more particularly to FIGS. 1 and 2, according to these figures, the free-wheeling device generally designated by reference numeral 10 is installed in the hub 11 of the guide wheel 12 of a hydrodynamic torque converter. The function of such a free-wheeling device is known as such an explanation thereof is therefore dispensed with herein. A recess or aperture 13 of the hub 11 serves for the accommodation of the free-wheeling device 10; the outer race 14 of the free-wheeling device 10 is directly inserted into the recess 13. The inner race 15 of the free-wheeling device is arranged inwardly thereof by means of a toothed or splined arrangement on the tubular connecting member 16 of the housing. A disk 17 assumes the function of covering off the entire free-wheeling device against the outside. The disk 17 is inserted by means of several, for example, four radially outwardly directed lugs or tabs 18 into corresponding apertures 19 of the hub 11 and is retained thereat by a spring ring 20 or the like.

The clamping or gripping rollers 21 of the free-wheeling device are supported on the cross tongues 23 of the cages 24 by means of so-called accordion springs 22. The clamping or gripping surfaces are provided at the outer race 14.

Figure 6:
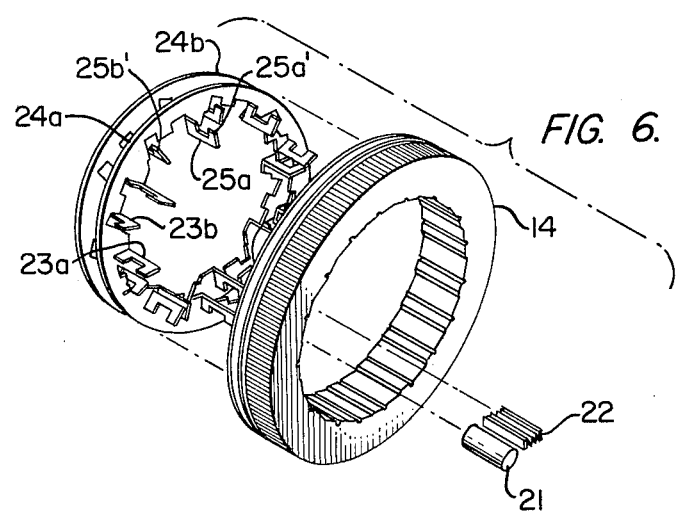
FIG. 6 is an exploded view of the free-wheeling arrangement of FIG. 1.
Figure 7:
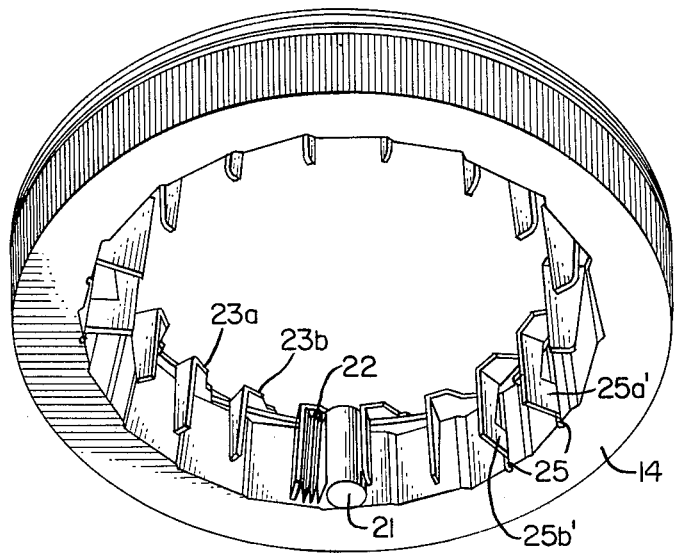
FIG. 7 is a perspective view of the assembled free-wheeling arrangement in accordance with the present invention.

The cage generally designated by reference numeral 24 consists of two identical annular disks 24a and 24b which are offset with respect to one another by half a pitch. The cross tongues 23a and 23b are punched or stamped out of these annular disks 24a and 24b in the manner already described and are bent off at right angle. As shown in FIGS. 6 and 7, the arrangement is thereby made in such a manner that the cross tongues of the ring 24b are able to extend through the openings in the ring 24a which resulted from the stampling or punching-out operation. Both rings 24a and 24b are clamped fast together between the outer race 14 and the hub 11. They are axially fixed in this manner. For the purpose of fixing the same in the direction of rotation, one further cross tongue 25a and 25b is provided at each ring 24a and 24b with radially outwardly directed nose portions 25a; 25b; which engage in corresponding grooves 25 provided in the outer race 14 of the free-wheeling device.

Figure 3:
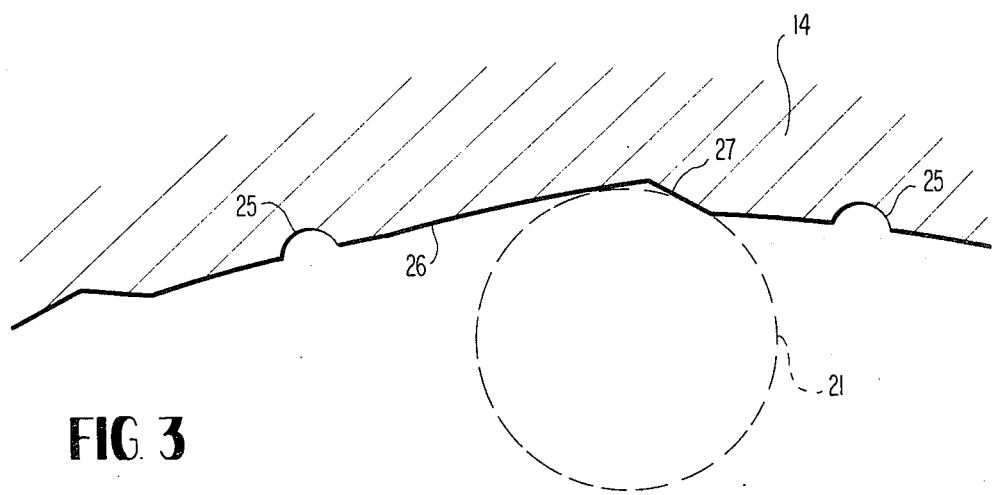
FIG. 3 is a partial cross-sectional view, on an enlarged scale, illustrating the inner contour of the outer race.

FIGS. 2, 3 and 7 clearly illustrate these grooves 25 in the outer race 14. They are disposed in the respective gripping or clamping surfaces 26 which according to the present invention are constructed in the manner of a logarithmic spiral approximated by a circular arc. Abutment flanks 27 are provided for the free-wheeling position. This inner contour of the outer race 14 can be appropriately manufactured by broaching.

Figure 4:
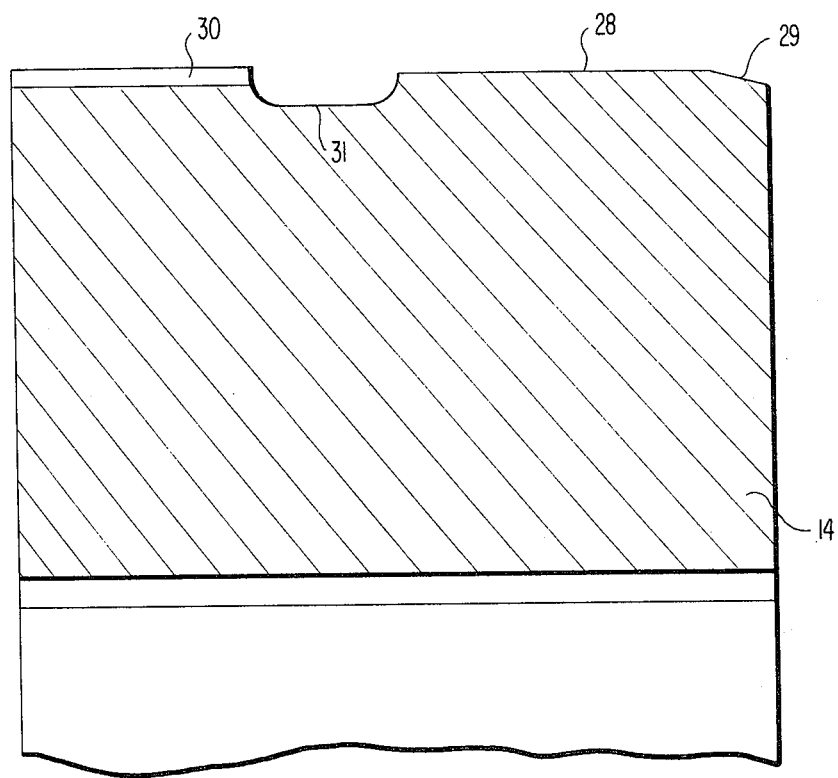
FIG. 4 is a partial cross-sectional view, also on an enlarged scale, through the outer race.

According to FIG. 4, the outer race 14 is provided at its outer circumference with a centering collar 28, by means of which it is initially guided in the opening 13 of the guide wheel hub 11 during the insertion. A bevelled surface 29 thereby serves for the facilitated insertion of the outer race 14. From the opposite side thereof, a toothed arrangement or serration 30 is machined into the outer circumference which is equipped with an axially parallel cutting flank. The outer race 14 is fixed in the opening 13 with the aid of this toothed arrangement 30. The teeth of the serration 30 thereby cut into the material of the hub 11. An annular groove 31 serves for the accommodation of the material displaced thereby, which is arranged between the centering collar 28 and the toothed arrangement 30 and which has a sufficient depth.

The control may be so constructed that the cross tongues are bent out in the direction of the spring force or are bent out in a direction opposite thereto. In the former case, they are stressed in the bending direction by the spring force.

Figure 5:
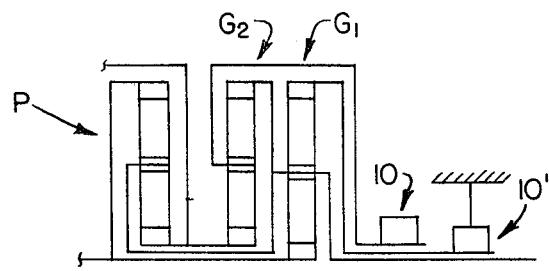
FIG. 5 is a schematic illustration of a planetary gear set with the free-wheeling arrangement of the present invention disposed at a reaction member thereof.

According to FIG. 5, a planetary gear set generally designated by the reference character P is provided which includes, for example, planetary gears generally designated by the reference character $G_1$, $G_2$, $G_3$ with free-wheeling devices 10, 10' being operatively connected with the gear set P.

While we have shown and described only one embodiment in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

We claim:

1. A free-wheeling arrangement comprising gripping rollers arranged between an inner race means and an outer race means equipped with gripping surfaces and short abutment flanks, spring means forcing the gripping rollers into the gripping position, the spring means being supported on cross tongues of a cage means, and the cage means being formed from an annular member disposed adjacent the gripping rollers, the cross tongues being stamped out of said annular member and being bent approximately at right angle to the plane of the annular member, characterized in that the annular member of said cage means is fixed in the axial direction by a clamping-in action between the outer race means and a structural part receiving the same, in that means are provided for securing the cage means against relative rotation, and in that the free-wheeling arrangement is covered off by a disk means secured at the structural part and serving simultaneously as abutment means for the gripping rollers.

2. A free-wheeling arrangement according to claim 1, characterized in that the annular member is formed by a sheet-metal ring.

3. A free-wheeling arrangement according to claim 2, characterized in that the spring means force the gripping rollers individually into the locking positions.

4. A free-wheeling arrangement according to claim 1, characterized in that the means for securing the cage means against rotation includes a radially outwardly directed nose portion provided at least at one cross tongue which engages in a cross groove provided in the inner contour of the outer race means.

5. A free-wheeling arrangement according to claim 4, characterized in that the structural part is a guide wheel hub.

6. A free-wheeling arrangement according to claim 4, characterized in that the free-wheeling arrangement is for the guide wheel of a hydrodynamic torque converter.

7. A free-wheeling arrangement according to claim 4, characterized in that the free-wheeling device is for the support of a reaction member in a planetary gear set.

8. A free-wheeling arrangement according to claim 4, characterized in that the cage means consists of two annular members which are rotated with respect to each other by one-half the spacing of the cross tongues, and in that each annular member is secured against rotation by means of a nose portion provided at a cross tongue and engaging in a separate cross groove provided in the outer race means.

9. A free-wheeling arrangement according to claim 8, characterized in that the outer race means is provided at the outer circumference with a toothed means and in that it is pressed into the bore of the structural part by means of said toothed means.

10. A free-wheeling arrangement according to claim 9, characterized in that the outer race means, starting from one side surface thereof, is provided with a centering collar and starting from the other side surfaces is provided with the toothed means, and in that a somewhat deeper annular groove for the accommodation of the displaced material is located between the centering collar and the toothed means.

11. A free-wheeling arrangement according to claim 10, characterized in that the centering collar terminates laterally in a bevelled surface.

12. A free-wheeling arrangement according to claim 11, characterized in that the annular member is formed by a sheet-metal ring.

13. A free-wheeling arrangement according to claim 12, characterized in that the spring means force the gripping rollers individually into the locking positions.

14. A free-wheeling arrangement according to claim 1, characterized in that the cage means consists of two annular members which are rotated with respect to each other by one-half the spacing of the cross tongues, and in that each annular member is secured against rotation by means of a nose portion provided at a cross tongue and engaging in a separate cross groove provided in the outer race means.

15. A free-wheeling arrangement according to claim 14, characterized in that the cage means consists of two substantially identical annular members.

16. A free-wheeling arrangement according to claim 15, characterized in that the annular members are sheet-metal members.

17. A free-wheeling arrangement according to claim 15, characterized in that the outer race means is provided at the outer circumference with a toothed means and in that it is pressed into the bore of the structural part by means of said toothed means.

18. A free-wheeling arrangement according to claim 17, characterized in that the outer race means, starting from one side surface thereof, is provided with a centering collar and starting from the other side surfaces is provided with the toothed means, and in that a somewhat deeper annular groove for the accommodation of the displaced material is located between the centering collar and the toothed means.

19. A free-wheeling arrangement according to claim 1, characterized in that the outer race means is provided at the outer circumference with a toothed means and in that it is pressed into the bore of the structural part by means of said toothed means.

20. A free-wheeling arrangement according to claim 19, characterized in that the outer race means, starting from one side surface thereof, is provided with a centering collar and starting from the other side surfaces is provided with the toothed means, and in that a somewhat deeper annular groove for the accommodation of the displaced material is located between the centering collar and the toothed means.

21. A free-wheeling arrangement according to claim 20, characterized in that the centering collar terminates laterally in a bevelled surface.

* * * * *

UNITED STATES PATENT OFFICE
CERTIFICATE OF CORRECTION

Patent No. 3,954,161          Dated May 4, 1976

Inventor(s) Fritz EHRET et al

It is certified that error appears in the above-identified patent and that said Letters Patent are hereby corrected as shown below:

Title Page as it now reads:

"[30] Foreign Application Priority Data
Aug. 28, 1973 Germany..............2343288"

Title Page as it should read:

--[30] Foreign Application Priority Data
Aug. 28, 1973 Germany..............2343289--

Signed and Sealed this thirtieth Day of August 1977

[SEAL]

Attest:

RUTH C. MASON
*Attesting Officer*

C. MARSHALL DANN
*Commissioner of Patents and Trademarks*